July 11, 1939.   H. N. FAIRBANKS ET AL   2,165,362
DRIVING MECHANISM FOR MOTION PICTURE APPARATUS
Filed April 17, 1937
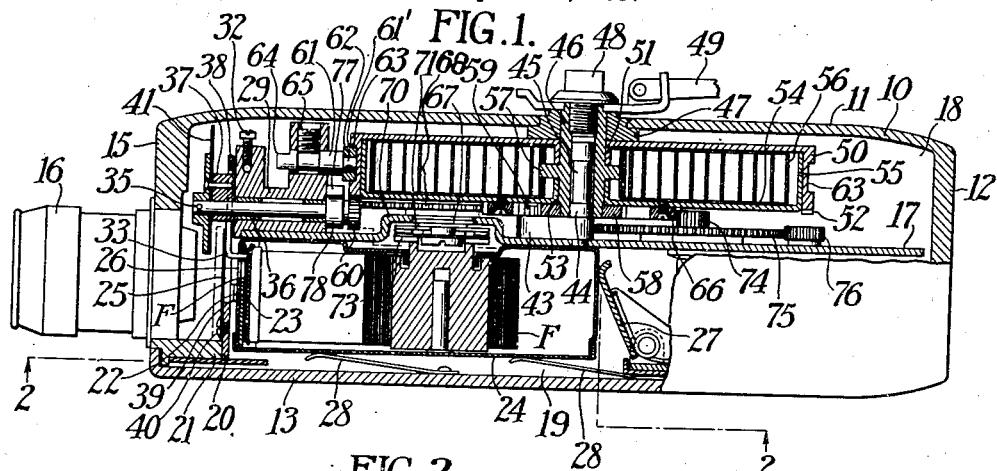
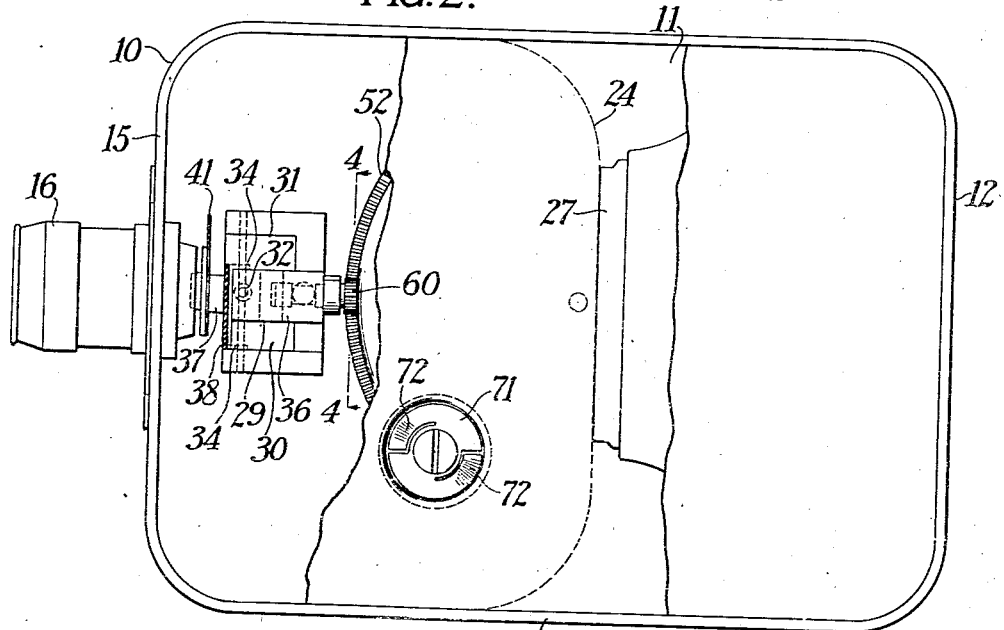
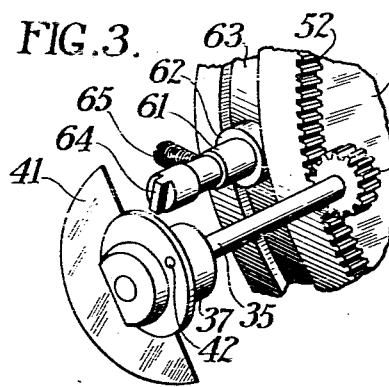
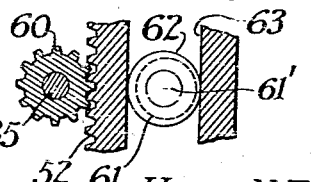
Henry N. Fairbanks
Carter J. Hughey
INVENTORS
BY
ATTORNEYS Patented July 11, 1939

2,165,362

UNITED STATES PATENT OFFICE 2,165,362

DRIVING MECHANISM FOR MOTION PICTURE APPARATUS

Henry N. Fairbanks and Carter J. Hughey, Rochester, N. Y., assignors to Eastman Kodak Company, Rochester, N. Y., a corporation of New Jersey Application April 17, 1937, Serial No. 137,490 In Germany January 20, 1937

8 Claims. (Cl. 88—17)

This invention relates to photography, and particularly to a driving mechanism for a small and compact motion picture camera.

The principal object of the present invention is to provide a simple and compact driving mechanism for a motion picture camera which lends itself to a small and compact camera without sacrificing any operating characteristics found in larger and more complicated mechanisms. Another object of the invention is to provide a motion picture camera wherein the drive between the film advancing and film exposing mechanisms and the spring motor is accomplished through one pair of gears comprising a crown gear of large diameter meshing with a small pinion gear. Still another object is to provide a guide means for engaging the crown gear adjacent the pinion gear for maintaining the two gears in proper engagement. And yet another object is to provide an adjustment for said guide means whereby the crown gear can be shifted relative to the pinion gear for initially obtaining a proper engagement between the two gears. And a further object is to provide a motion picture camera which is simple in construction and is easy to assemble.

Briefly, the invention comprises a crown gear of large diameter rotating with the motor casing and engaging a pinion gear to drive the film advancing and film exposing mechanisms. In order to insure proper engagement between the crown gear and the pinion gear, a guide roller is adapted to extend into an annular groove in the periphery of the crown of the crown gear adjacent the pinion gear. For ease in assembling, the guide roller is provided with an adjustment by means of which the roller can be moved relative to, and radially of, the pinion gear and along with it the crown gear so that a proper engagement between the crown gear and pinion gear can be initially obtained and thereafter maintained.

The novel features that we consider characteristic of our invention are set forth with particularly in the appended claims. The invention itself, however, both as to its organization and its method of operation, together with additional objects and advantages thereof, will best be understood from the following description of specific embodiments when read in connection with the accompanying drawing in which, Fig. 1 is a partial horizontal section of the camera taken substantially through the axis of the objective, Fig. 2 is a side view of the camera taken approximately on line 2—2 of Fig. 1, and looking in the direction of the arrows, Fig. 3 is an enlarged perspective detail showing the engagement of the crown gear and pinion gear, and the guide roll for maintaining the proper engagement between the two gears, and, Fig. 4 is an enlarged fragmentary section taken on line 4—4 of Fig. 2.

Like reference characters refer to corresponding parts throughout the drawing.

Referring now to the drawing, 10 designates a housing having a lateral wall 11, a rear end wall 12, a door 13 hinged at its lower end to the bottom 14 and forming the other lateral wall of the housing, and a front end wall 15 on which an objective 16 is mounted. The housing 10 is divided into substantially two major compartments by the mechanism plate 17 which is supported intermediate and parallel to the lateral walls, one of the compartments 18 serving to enclose the mechanism of the camera, and the other compartment 19 serving as a magazine chamber 19. A locating plate 20 fixed to the projection 21 on the front wall 15 extends across the magazine chamber 19 to form the forward or locating wall thereof, and said locating plate has a button 22 fixed thereto against which a button 23 on the film magazine 24 is abutted for properly locating the film strip F in the focal plane of the objective 16, see Fig. 1. The locating plate 20 has an opening 25, which is in alignment with the objective 16, and with the exposure aperture 26 in the film magazine. The film magazine 24 is properly located and held longitudinally of the magazine chamber by the spring actuated presser member 27 which engages the rear wall of the magazine, and is properly positioned laterally of the chamber by the action of spring fingers 28 on the door 13 which normally press it against the mechanism plate 17 when the door is closed.

On the forward end of the mechanism plate 17 and on the mechanism side thereof is fixed a bearing block 29 said bearing block being recessed at 30 and 31, see Fig. 2, for the purpose hereinafter described. A guide rod extends through the bearing block 29 and across the recesses 30 and 31 therein and is held in place in the bearing block by the set screw 32. The film claw 33 is slidably mounted on those portions of the guide rod passing through the recesses 31 and 30 by having the rod passing through perforated ears 34 formed on the claw. The body of the film claw 33 is provided with a rectangular opening, not shown, through which extends the drive shaft 35 which passes through the bearing block 29 and is rotatably mounted in stationary journal 36 therein. An eccentric 37 is fixed on that portion of the shaft 35 passing through the film claw 33 and engages the upper and lower edges of the rectangular opening therein to reciprocate the claw 33 when the shaft 35 is rotated. The film engaging portion of the claw constitutes an L-shaped arm 38 which extends laterally of the body of the claw and extends into the opening 25 in the locating plate 20 and through the exposure aperture 26 in the film magazine, see Fig. 1. The film claw is normally pressed toward the film strip F by the spring 39 mounted on the locating plate 20 by a screw 40. The particular type of film claw that has been described was used for illustrative purposes only, and since it forms no part of this invention, a more detailed showing or description of the same is not deemed necessary. A more detailed description of the cooperation of the film magazine and the camera when the magazine is inserted into the magazine chamber can be had by referring to pending application Serial No. 130,143 in the name of Henry N. Fairbanks.

On the end of the drive shaft 35 adjacent to the eccentric 37 is mounted the shutter 41 which is adapted to intermittently intercept the light rays passing through the objective 16 to the film strip F. The shutter 41 is pinned to the eccentric 37 by the pin 42 in a proper relative position on the shaft 35 so that when the eccentric 37 is in a position to move the claw 33 downward and advance the film strip the shutter intercepts the light rays passing through the objective, and when the claw is moving upward and the film is stationary the shutter permits the light rays from the objective to strike the film.

To the mechanism plate 17 is fastened a semi-circular bearing member 43 on which there is a spindle 44 having a reduced portion 45. A motor core 46 is rotatably mounted on the spindle 44 and has one end journaled in a ring bearing 47 fixed to the lateral wall 11 and extending through an opening therein while the other end bears on the semi-circular bearing member 43. A winding key 48 is screw-threaded into the open end of the core 46 and extends outside of the lateral wall 11 so that the handle 49 can be snapped thereover to wind the motor by rotating the motor core.

The motor casing constitutes a cup-shaped member 50 provided with a sleeved opening 51 at its center, said sleeved opening engaging the lower end of the core 46 to rotatably mount the cup member thereon. A large crown gear 52 is provided with a sleeved opening 53 at the center of its web 54 which slips onto the core 46 to be rotatable with respect thereto, and the crown 55 thereof telescopes with and frictionally engages the flange of the cup member 50 to form a closed motor casing. A motor spring 56 is spirally wound and contained within the motor casing, and has one end slotted to engage the projections 57 on the core 46 while the other end is fastened to the flange of the cup member 50 through a pin and slot connection, not shown. In order to prevent the core 46 from rotating when the spring motor is released or when the motor is wound up, a ratchet member 58 is mounted on the core 46 between the cup-shaped member 50 of the motor casing and the semi-circular bearing member 43; and this ratchet member is engaged by a double-ended pawl 59 which is fixed to the surface of a semi-circular bearing member 43.

In order to drive the shutter 41 and the film claw 33 directly from the spring motor to give a simple and compact driving mechanism, the crown gear 52 directly engages a pinion 60 fixed to the end of the drive shaft 35. The gear ratio between the crown gear 52 and the pinion gear 60 is such as to give the proper operating speed to the shutter and pull down from the rotation of the spring motor, and in the present case this gear ratio is equal to about 20 to 1. It will be readily understood by those familiar with the art that since the crown gear 52 and the cup-shaped member 50 which go to make up the motor casing are rotatably mounted on the core 56 instead of being fixed thereto to rotate therewith, the periphery of the motor casing, which is the crown 55 of the crown gear 52, will have a tendency to wobble as the motor rotates relative to the core, or when the motor is operating. Although the clearance of the bearing between the motor casing and the core may be reduced to a minimum at this point, due to the large diameter of the crown gear 52 the periphery of the gear will be subject to an appreciable wobble which will cause an improper engagement between the crown gear 52 and the pinion 60, and the wobble in the crown gear will increase with frictional wear. In order to allow for ease in assembling the motor casing on the core 46 relative to the pinion 60 and to take up for any wear in the bearing between the motor casing and the core 46, a guide means and an adjustment therefor has been provided by means of which a proper engagement between the crown gear 52 and the pinion 60 can be obtained and maintained to overcome any wobble found in the periphery of the crown gear.

A stub shaft 61 is journalled in the bearing block 29 and has a reduced end 61' thereon which is eccentric with the shaft proper and which projects into an annular groove 63 around the periphery of the crown 55 of the crown gear 52 adjacent the pinion gear 60, see Figs. 1 and 4. A guide roller 62 is rotatably mounted on the end 61' of the shaft 61 extending into the annular groove 63, and is of a size to engage the edges of the groove, and thereby guide the periphery of the crown gear 52 adjacent to the pinion 60 to maintain a proper engagement between the gears regardless of any wobble that the periphery of the gear 52 is subject to. For initially obtaining the proper engagement between the crown gear 52 and the pinion gear 60, the stub shaft 61 is rotated by applying a wrench to the milled end thereof. As the shaft 61 is rotated, the reduced end 61' thereof, due to its eccentricity relative to the shaft proper, will move relative to and radially of the pinion gear 60, and the guide roller 62 will move in a corresponding path moving that portion of the periphery of the crown gear 52 adjacent the pinion gear 60 radially relative to the pinion gear. The stub shaft 61 is held in any given adjusted position by the set screw 65 which is adjustable in the bearing block 29.

A ring gear 66 fastened to the lower face of the motor casing engages and drives a spur gear 68 which is in turn fastened to the takeup clutch member 67 journaled in and extending through an apertured offset portion 70 in the mechanism plate 17 and into the magazine chamber 19. The takeup clutch member 67 includes a disk 71 of spring metal which is cut to provide spring fingers 72 which normally project from the plane of the disk to serve in the manner of a ratchet. When a film magazine 24 is inserted into the magazine chamber 19, the disk 71 is adapted to operatively engage the clutch disk 73 connected to the takeup spool in the film magazine and projecting through the wall thereof, whereby a driving connection is made between the spring motor and the takeup reel in the film magazine so that the film is wound up as it is advanced by the film claw.

The spring motor speed may be controlled by a governor, not shown, which is situated behind the magazine chamber 19, and is connected thereto by the gear train including the ring gear 66 on the motor casing, the pinion 74 fixed to the governor drive gear 75, and the governor pinion 76. The governor and its connection with the spring motor form no part of this invention, and is merely indicated in the drawing and noted herein to show how it could be included to carry out the compactness of the camera as a whole.

When the spring motor is to be wound, the motor casing is held stationary by virtue of a releasable stop, not shown, engaging the offset 77 on the eccentric 78 fixed to the drive shaft 35, and the core 46 is rotated in a counter-clockwise direction to wind up the spring. When the motor is completely wound up the core is held from rotating in a clockwise direction by virtue of the engagement of the double-ended pawl 59 engaging the ratchet member 58 rotatable with the core 46. The motor is released by removing the hereinbefore mentioned releasable stop from the path of the eccentric 78, and the motor casing is allowed to rotate relative to the core 46 whereupon the crown gear 52 drives the film exposing and film advancing mechanism; and the ring gear 66 drives the takeup clutch 67 and connects a governor into the gear train.

Although we have shown and described certain specific embodiments of our invention, we are fully aware that many modifications thereof are possible. Our invention, therefore, is not to be restricted except in so far as is necessitated by the prior art and by the spirit of the appended claims.

Having thus described our invention, what we declare is new and desire to secure by Letters Patent of the United States is:

1. In a motion picture apparatus the combination with a crown gear of large diameter, a support at the center of said gear and on which said gear rotates, a motor spring of a width less than that of the crown of the crown gear contained within said crown gear, said motor spring having one end attached to the crown of said crown gear and the other end attached to said support, a pinion gear, and a stationary journal for supporting said pinion gear in engagement with said crown gear, of a guide means engaging said crown gear adjacent said pinion gear and for maintaining proper and uniform engagement between said gears.

2. In a motion picture apparatus, the combination with a crown gear of large diameter having an annular groove around the periphery of the crown thereof, a support at the center of said gear and on which said gear rotates, a shaft carrying a pinion gear, a stationary journal supporting said shaft with said pinion gear in engagement with said crown gear, a shutter on said shaft, and a film advancing mechanism including a cam also on said shaft, of a guide means extending into the groove adjacent said pinion gear to engage the edges of the groove and for maintaining proper and uniform engagement between said gears and means for adjusting said guide means relative to said pinion to obtain a proper engagement between the crown gear and pinion gear.

3. In a motion picture apparatus, the combination with a crown gear of large diameter and having an annular groove around the periphery of the crown thereof, a support at the center of said gear and on which said gear rotates, and a pinion gear supported for engagement with said crown gear, of a roller extending into the annular groove in the crown thereof, adjacent the pinion gear, said roller adapted to engage the edges of the groove for maintaining the crown gear and the pinion gear in proper engagement.

4. In a motion picture apparatus, the combination with a crown gear of large diameter and having an annular groove around the periphery of the crown thereof, a support at the center of said gear and on which said gear rotates, and a pinion gear supported for engagement with said crown gear, of a stub shaft extending into said annular groove radially of the crown gear adjacent said pinion gear, a roller mounted on said stub shaft to engage the edges of the annular groove in the crown gear and for maintaining a proper engagement between the two gears, and means for adjusting said stub shaft relative to the pinion whereby the roller thereon moves radially of the pinion and for obtaining proper engagement between the two gears.

5. In a motion picture apparatus, the combination with a crown gear of large diameter and having an annular groove around the periphery of the crown thereof, a support at the center of said gear and on which said gear rotates, and a pinion gear supported for engagement with said crown gear, of a stub shaft extending into said annular groove radially of the crown gear adjacent said pinion gear, a roller mounted on said stub shaft to engage the edges of the annular groove in the crown gear and for maintaining a proper engagement between the two gears, said stub shaft being eccentrically mounted whereby the roller thereon can be shifted relative to and radially of the pinion gear for obtaining a proper engagement between the crown gear and pinion gear.

6. In a motion picture apparatus, the combination with a housing, a shaft rotatably mounted therein, a film advancing mechanism including a cam mounted on said shaft, a film exposing mechanism on said shaft, a pinion on said shaft, a core rotatably mounted in the housing, a spring motor mounted on said core, said spring motor including a cup member rotatably mounted on the core, a crown gear of large diameter having an annular groove around the crown thereof telescopically engaging said cup member to form a closed casing and being rotatably mounted on the core in engagement with the pinion, a spiral spring enclosed in said casing and having one end fixed to the core and the other end fixed to the casing, of a guide roller extending into the annular groove in the crown gear adjacent the pinion to engage the edges of said groove, and for maintaining the crown gear and the pinion gear in proper engagement.

7. In a motion picture apparatus, the combination with a housing, a shaft rotatably mounted therein, a film advancing mechanism including a cam mounted on said shaft, a film exposing mechanism on said shaft, a pinion on said shaft, a core rotatably mounted in the housing, a spring motor mounted on said core, said spring motor including a cup member rotatably mounted on the core, a crown gear of large diameter having an annular groove around the crown thereof telescopically engaging said cup member to form a closed casing and being rotatably mounted on the core in engagement with the pinion, a spiral spring enclosed in said casing and having one end fixed to the core and the other end fixed to the casing, of a guide roller extending into the annular groove in the crown gear adjacent the pinion to engage the edges of said groove, and for maintaining the crown gear and the pinion gear in proper engagement, and means for adjusting the guide roller relative to and radially of the pinion gear for obtaining the proper engagement between the two gears.

8. In a motion picture apparatus, the combination with a crown gear of large diameter and having an annular groove around the periphery of the crown thereof, a support at the center of said gear on which the same rotates, and a pinion gear supported for engagement with said crown gear, of a guide means extending into the annular groove adjacent said pinion gear to engage the edges of said groove, and means for adjusting said guide means radially of the pinion gear for moving the crown gear toward or away from the pinion gear to obtain a proper engagement therebetween.

HENRY N. FAIRBANKS.
CARTER J. HUGHEY.